United States Patent
Moen et al.

[11] Patent Number: 5,858,505
[45] Date of Patent: Jan. 12, 1999

[54] MACROSCOPICALLY PERFORATED POROUS POLYTETRAFLUOROETHYLENE MATERIALS

[75] Inventors: Layne L. Moen; James T. Walter, both of Flagstaff, Ariz.

[73] Assignee: W. L. Gore & Associates, Inc., Newark, Del.

[21] Appl. No.: 760,332

[22] Filed: Dec. 4, 1996

Related U.S. Application Data

[63] Continuation of Ser. No. 576,266, Dec. 21, 1995, abandoned, which is a continuation of Ser. No. 329,049, Oct. 25, 1994, abandoned, which is a continuation of Ser. No. 19,390, Feb. 18, 1993, abandoned.

[51] Int. Cl.$^6$ .............................. B29C 55/00; B28B 1/48; B26F 1/00; B32B 3/24
[52] U.S. Cl. .......................... 428/131; 428/137; 428/910; 428/421; 428/422; 428/316.6; 428/304.4; 428/317.9; 428/323; 264/288.8; 264/156; 264/118; 264/127; 264/235.6; 264/235.8; 264/175; 264/291; 156/229; 156/244.11; 156/244.18
[58] Field of Search ...................................... 429/131, 137, 429/910, 421, 422, 316.6, 304.4, 317.9, 323; 264/288.87, 156, 118, 127, 235.6, 235.8, 291, 175; 156/229, 244.11, 244.18

[56] References Cited

U.S. PATENT DOCUMENTS

| | | |
|---|---|---|
| 3,953,566 | 4/1976 | Gore .......................................... 264/288 |
| 3,985,599 | 10/1976 | Lepoutre et al. ........................ 478/910 |
| 4,145,383 | 3/1979 | Sako et al. ................................ 264/118 |
| 4,187,390 | 2/1980 | Gore ........................................... 55/486 |
| 4,385,093 | 5/1983 | Hubis ....................................... 156/229 |
| 4,478,665 | 10/1984 | Hubis ..................................... 428/316.6 |
| 4,647,416 | 3/1987 | Seiler et al. ............................. 264/118 |
| 4,707,314 | 11/1987 | Kawahigashi et al. ............... 264/288.8 |
| 4,842,794 | 6/1989 | Hovis et al. ............................. 264/145 |
| 4,964,992 | 10/1990 | Goldsmith et al. ..................... 264/156 |
| 5,167,890 | 12/1992 | Sasshofer et al. ................... 264/288.8 |

FOREIGN PATENT DOCUMENTS

| | | |
|---|---|---|
| 0203820 | 12/1986 | European Pat. Off. . |
| 3704217 | 9/1987 | Germany . |
| 2187460 | 9/1987 | United Kingdom . |

OTHER PUBLICATIONS

"Improved tissue ingrowth and anchorage of expanded polytetrafluoroethylene by perforation: an experimental study in the rat" Biomaterials, Jan. 1991; 12:22–24.

*Primary Examiner*—William Watkins
*Attorney, Agent, or Firm*—Wayne D. House

[57] ABSTRACT

A macroscopically perforated porous expanded polytetrafluoroethylene sheet material having a microstructure of nodes interconnected by fibrils wherein the perforations have a minimum diameter of about 0.1 mm and wherein the orientation of a fibril varies as a function of the proximity of a fibril to the edge of a perforation. The length of the fibrils may also vary as a function of the proximity of a fibril to the edge of a perforation. The sheet material may alternatively be provided in a tubular form.

57 Claims, 13 Drawing Sheets

MACROSCOPICALLY PERFORATED POROUS POLYTETRAFLUOROETHYLENE MATERIALS

This application is a continuation of application Ser. No. 08/576,266 filed Dec. 21, 1995 abandoned which is a continuation of application Ser. No. 08/329,049 filed Oct. 25, 1994 abandoned which is a continuation of application Ser. No. 08/019,390 filed Feb. 18, 1993 abandoned.

FIELD OF THE INVENTION

This invention relates to the field of porous expanded polytetrafluoroethylene materials having macroscopic perforations through the thickness of the materials.

BACKGROUND OF THE INVENTION

Strong porous polytetrafluoroethylene (hereinafter PTFE) products and their method of manufacture involving expansion by stretching were first described in U.S. Pat. Nos. 3,953,566 and 4,187,390. These products have found widespread acceptance in a variety of fields including medical devices, fabrics, electrical insulation, filtration, sealants and packings, and threads and filaments for weaving and sewing. Porous expanded PTFE products have been particularly useful in the field of medical devices because of the highly inert chemical character of PTFE and because the characteristics of the microstructure of the porous expanded PTFE can be controlled to either allow or preclude ingrowth of living tissues. These medical devices include vascular grafts, vascular and hernia patch repair materials, sutures, ligaments and periodontal repair materials. In fabric constructions, porous expanded PTFE materials have been particularly useful because they are both waterproof and breathable. Porous expanded PTFE is particularly useful as an electrical insulating material because of its high dielectric constant. All of these articles using porous expanded PTFE made as taught by U.S. Pat. No. 3,953,566 have a microstructure of nodes interconnected by fibrils.

Heretofore, there have been relatively few applications calling for porous expanded PTFE materials containing macroscopic perforations through the thickness of the material. A paper by J. M. Schakenraad describing GORE-TEX® Soft Tissue Patch repair material containing perforations made with a 22 gauge needle (25 perforations per square cm) suggests that such a perforated material allows for faster tissue ingrowth than a comparable unperforated material (Improved tissue ingrowth and anchorage of expanded PTFE by perforation: an experimental study in the rat. Biomaterials 1991 vol 12 January). Microscopic evaluation of perforations made in porous expanded PTFE materials that had been expanded prior to perforation reveals that the perforations have extremely rough edges, apparently resulting from irregular cutting and distortion of the material during penetration by the needle. It has been found that alternative methods of making perforations in porous expanded PTFE, such as by removing material with a sharp blade, also result in perforations having rough edges. Further, these methods of forming perforations in porous expanded PTFE result in only slight deformation of the node and fibril microstructure immediately adjacent to the edge of the perforation.

The present invention relates to a macroscopically perforated porous expanded PTFE sheet material having perforations formed prior to the expansion of the PTFE sheet material. The macroscopically perforated porous expanded PTFE sheet material of the present invention may optionally have perforations with substantially smooth edges as opposed to the rough edges resulting from perforations created subsequent to expansion.

U.S. Pat, No. 4,647,416 teaches a method of providing reinforcing ribs on the exterior of a porous expanded PTFE tube by exteriorly circumferentially scoring the wall of a tubular PTFE extrudate prior to expansion of the extrudate. The scoring is required to be of a depth substantially less than the thickness of the wall to avoid weakening and perforating the tube.

SUMMARY OF THE INVENTION

The present invention is a macroscopically perforated porous expanded PTFE sheet material comprising a sheet of porous expanded PTFE having a microstructure of nodes interconnected by fibrils, and having macroscopic perforations through the sheet material wherein the perforations have a minimum diameter of about 0.1 mm and wherein the orientation of a fibril varies as a function of the proximity of the fibril to the edge of a perforation. The length of the fibrils may also vary as a function of the proximity of the fibril to the edge of a perforation. The sheet material may alternatively be provided in a tubular form.

The process for making these macroscopically perforated porous expanded PTFE materials having a microstructure of nodes connected by fibrils, comprises extruding a preformed billet of a mixture of PTFE and liquid lubricant (preferably in the form of a coagulated dispersion) to form an extrudate, forming macroscopic perforations through the extrudate, removing the liquid lubricant from the extrudate, expanding the PTFE by stretching while maintaining the PTFE at a temperature between about 35° C. and the crystalline melt point during stretching, and heating the PTFE. Alternatively, the liquid lubricant may be removed prior to forming the macroscopic perforations through the extrudate. The perforations may be formed by piercing the extrudate with a piercing tool, by forming slits through the extrudate, or by removing discrete areas from the extrudate by cutting or other suitable processes. These perforations may be formed either before or after removing the lubricant from the extrudate.

In still another alternative, multiple layers of the extrudate may be laminated together by calendering prior to creating perforations by slitting, piercing or removing material. Preferably, the multiple layers of extrudate to be calendered are stacked in alternating directions so that the direction of extrusion of any particular layer is oriented at an angle of 90° with respect to the direction of extrusion of an adjacent layer. This method of alternating the direction of orientation of adjacent layers is more likely to produce a calendered laminate having equal strength characteristics regardless of the direction of an applied load. Additionally, the calendered laminate may be compressed under heat and pressure prior to or simultaneous with creating the perforations. The lamination by calendering and hot compression processes are taught by U.S. Pat. Nos. 4,385,093 and 4,478,665.

Macroscopic perforations are herein considered to be perforations visible to the naked eye and visibly open through the thickness of the material, and additionally having a minimum diameter of at least about 0.1 mm. The general shape of a perforation may be round, elliptical, triangular, square, rectangular, hexagonal, etc. For non-circular perforations having a length or long diameter and a width or short diameter, the term minimum diameter is defined herein as the maximum dimension, measured substantially parallel to the surface of the sheet material, that describes the width or short diameter of the non-circular perforation. The minimum diameter is to be measured with the sample in a relaxed state with no deforming force. The mean minimum diameter is determined by randomly selecting a sample area containing at least 10 macroscopic perforations, locating and measuring the minimum diameter of the ten largest perforations within that area and calculating the mean diameter of those ten perforations. If it is not possible to obtain a sample containing at least ten perforations, then all perforations within the area of the largest sample obtainable should be included in the calculation of the mean value.

Macroscopically perforated porous expanded PTFE sheet materials are anticipated to be useful as hernia repair patch materials allowing tissue to grow through the macroscopic perforations of the patch material. The growth of tissue through the thickness of such a patch material is desirable in many tissue repair applications.

BRIEF DESCRIPTION OF THE DRAWINGS

FIG. 2A describes a sheet of porous expanded PTFE having macroscopic perforations formed after expansion and sintering of the sheet material. FIGS. 2B, 2C and 2D describe sheets of porous expanded PTFE having macroscopic perforations formed before expansion and sintering of the sheet materials.

DETAILED DESCRIPTION OF THE INVENTION

Figure 1:
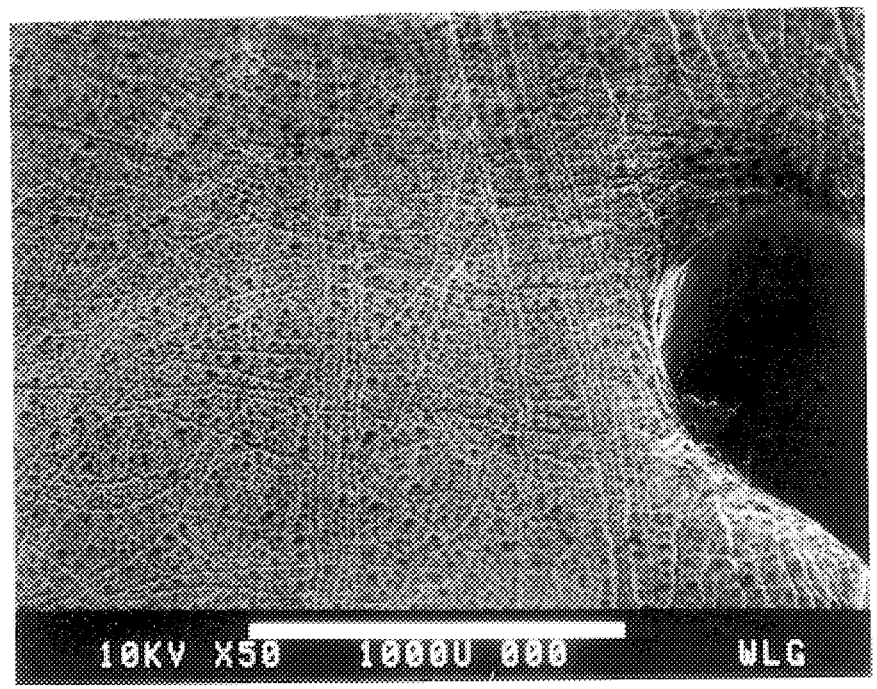
FIG. 1 describes a scanning electron photomicrograph (50x) of a perforation made through a sheet of porous expanded PTFE tissue repair material (GORE-TEX Soft Tissue Patch) by piercing the expanded material with a needle.

FIG. 1 describes a scanning electron photomicrograph of a perforation made through a sheet of GORE-TEX Soft Tissue Patch of about 1.0 mm thickness by piercing the sheet with a taper-point metal needle of about 1.2 mm diameter. The photomicrograph describes a surface view of the material including a portion of the perforation formed by piercing with the needle. The perforation has remnants of PTFE at scattered locations around the edges of the perforation. These remnants are believed to be the result of mechanical damage caused by piercing with the needle. Additionally, the microstructure of the sheet material remains uniform and substantially undisturbed except for the region immediately adjacent to and within about 0.1 mm of the edge of the perforation. The uniform orientation and length of the fibrils remains undisturbed except for within this very narrow region.

Figure 2A:
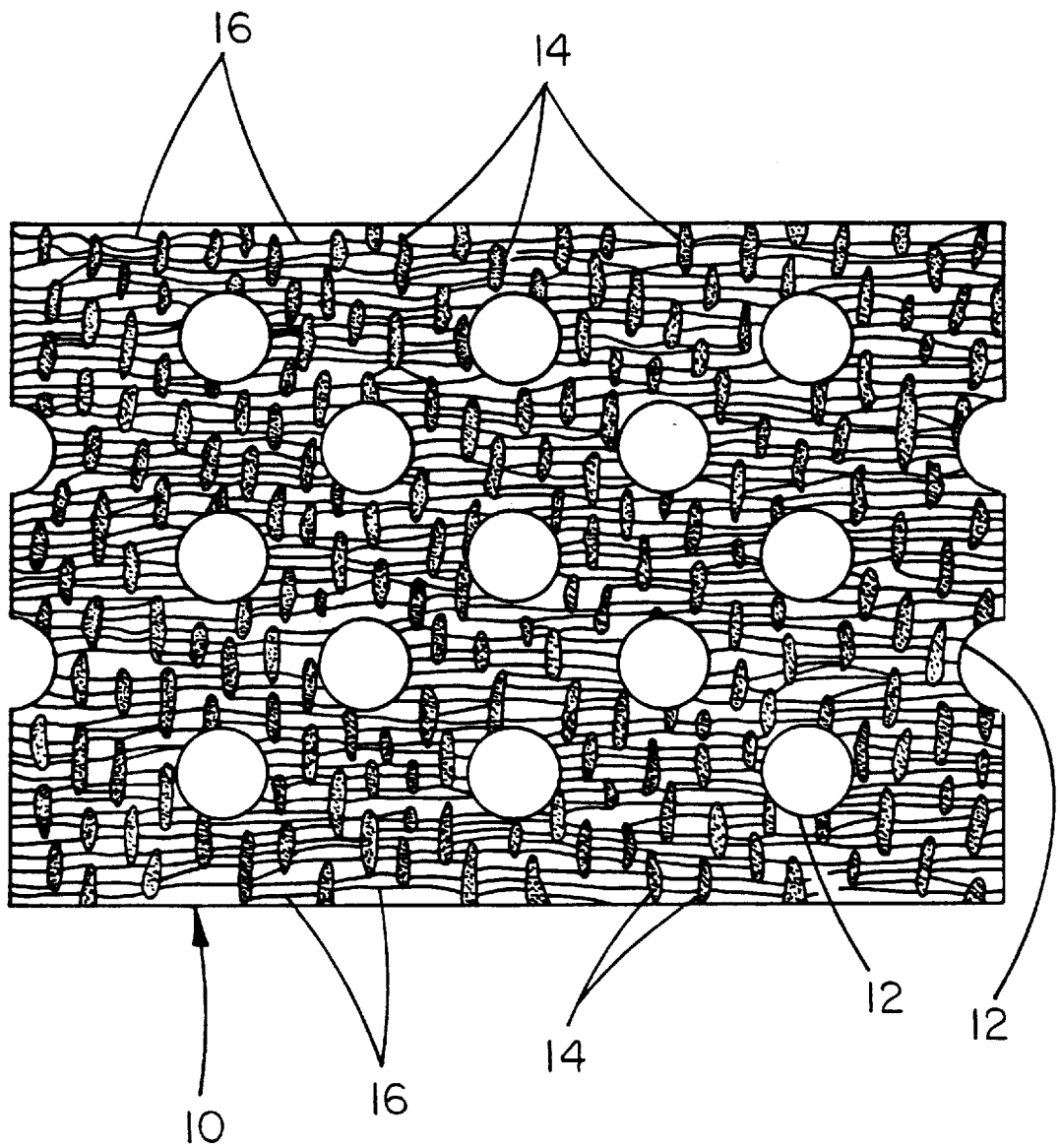
FIGS. 2A, 2B, 2C and 2D describe schematic representations of porous expanded PTFE sheet materials having microstructures of nodes interconnected by fibrils.

FIG. 2A describes a schematic representation of a sheet 10 of porous, uniaxially expanded PTFE having a microstructure of nodes 14 interconnected by fibrils 16 and further containing a series of macroscopic perforations 12. The macroscopic perforations 12 were made subsequent to uniaxial expansion of the sheet material as indicated by the lack of deformation of the node and fibril microstructure. Typically, the only deformation that occurs when perforations are made subsequent to expansion is immediately adjacent to, that is, within about 0.1 mm of the edge of a perforation.

Figure 2B:
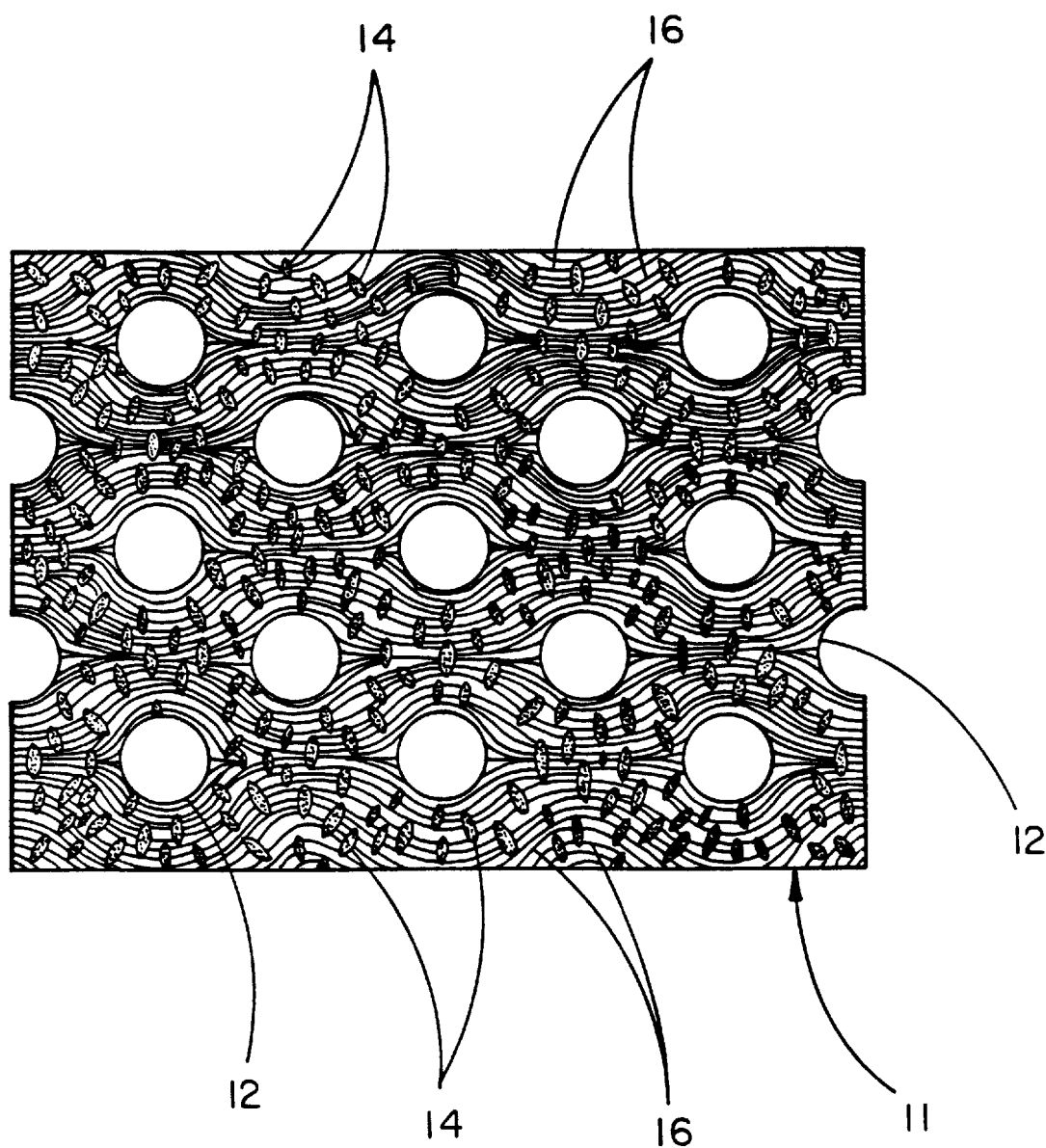
Figure 2C:
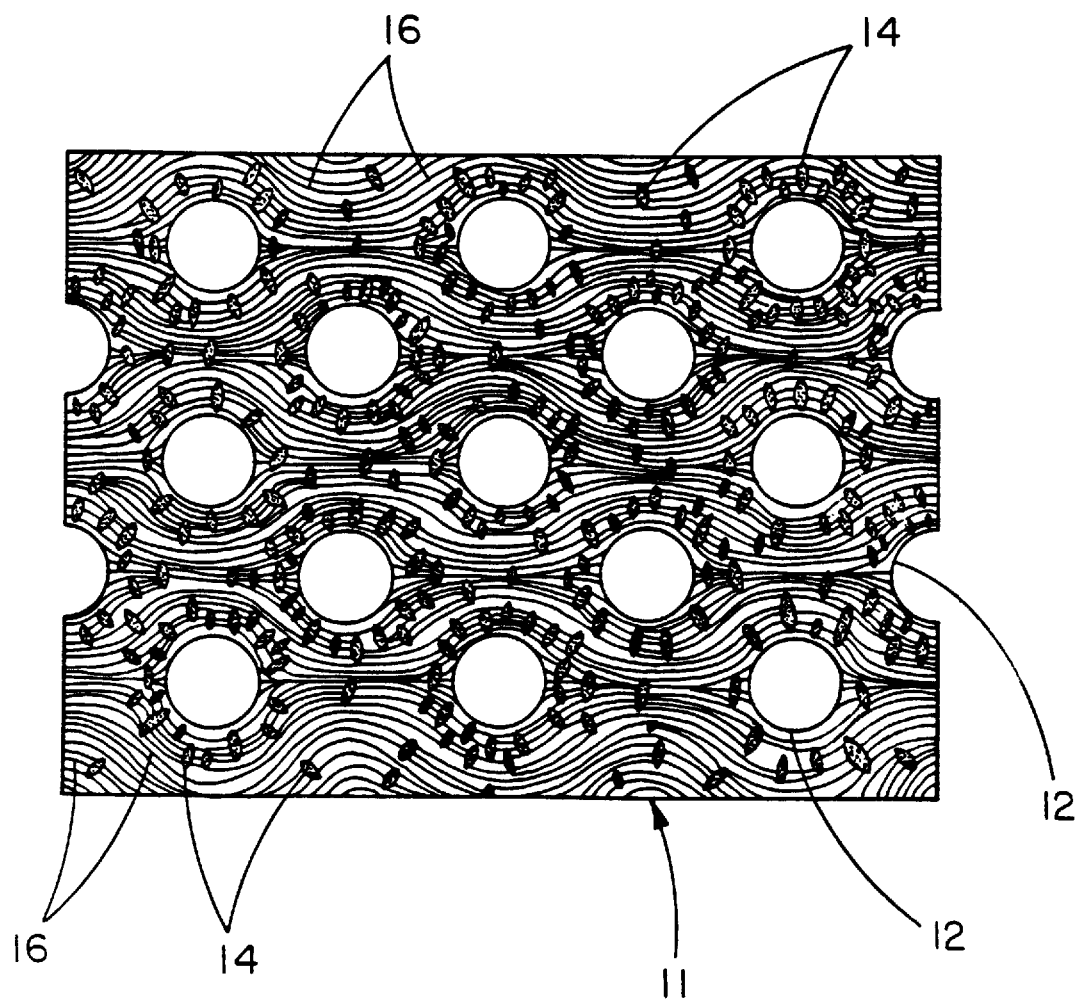
Figure 2D:
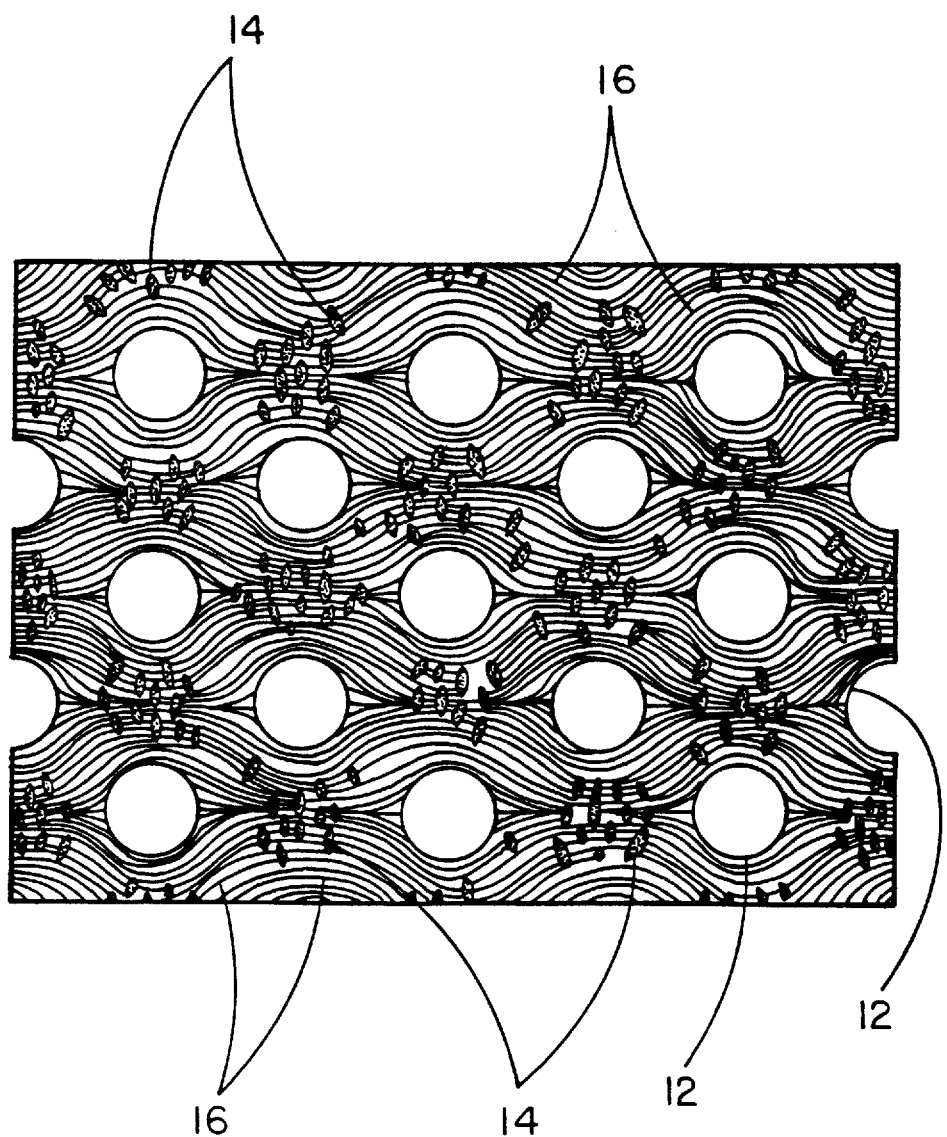

FIGS. 2B, 2C and 2D describe schematic representations of uniaxially expanded porous PTFE sheet materials 11 of the present invention having macroscopic perforations 12 through the materials wherein the perforations 12 were formed prior to expansion of the sheet materials 11. FIG. 2B describes the variable orientation of the fibrils 16 as a function of the proximity of any fibril 16 to the edge of a perforation 12. FIGS. 2C and 2D also indicate variable orientation of the fibrils 16. Further, FIGS. 2C and 2D describe variations in fibril length, that is, the spacing between adjacent nodes 14, as a function of proximity of a fibril 16 to the edge of a perforation 12. FIG. 2C shows fibril length becoming reduced with the proximity of a fibril 16 to the edge of a perforation 12; FIG. 2D describes the reverse situation wherein fibril length becomes increased as a function of the proximity of a fibril 16 to the edge of a perforation 12.

While FIGS. 2A, 2B, 2C and 2D all describe uniaxially expanded materials wherein adjacent fibrils are substantially parallel to each other, the same relationships regarding the orientation of fibrils with respect to the edges of perforations created either before or after expansion, hold true for biaxially expanded materials containing fibrils oriented at various angles with respect to the original direction of extrusion of the sheet material. The variable orientation of fibrils of biaxially expanded sheet materials containing macroscopic perforations formed prior to expansion are shown by various photomicrographs of biaxially expanded examples of the present invention reproduced herein.

Various examples of the present invention were created by piercing, slitting, removal of material by cutting, or die stamping perforations through a PTFE extrudate prior to expansion. The extrudate used for all examples was made by the same process.

Figure 4A:
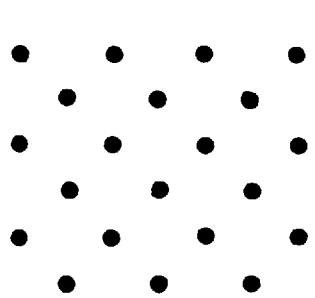
FIG. 4A describes a pattern of perforations made by piercing a sheet of PTFE extrudate with a taper-point, 1.17 mm diameter steel needle prior to expansion to subsequently create a sheet of macroscopically perforated porous expanded PTFE.

Piercing is used herein to describe perforations made by forcing a pointed object of round cross section such as a taper point needle through the thickness of the extrudate. The pattern used to create pierced perforations is described by FIG. 4A wherein the minimum dimension between perforations is about 7 mm.

Figure 3A:
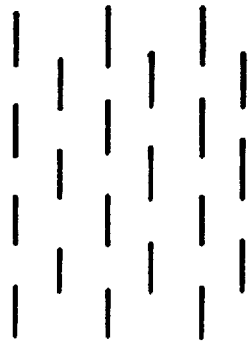
FIG. 3A describes a pattern of perforations made by slitting a sheet of PTFE extrudate prior to expansion to subsequently create a sheet of macroscopically perforated porous expanded PTFE.
Figure 3D:
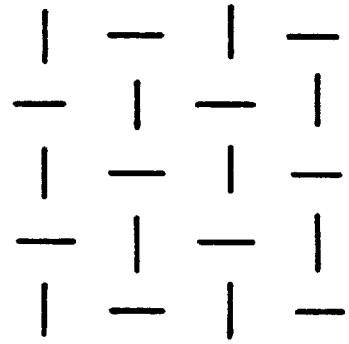
FIG. 3D describes an alternative pattern of perforations to that described by FIG. 3A, made by slitting a sheet of PTFE extrudate prior to expansion to subsequently create a sheet of macroscopically perforated porous expanded PTFE.
Figure 3B:
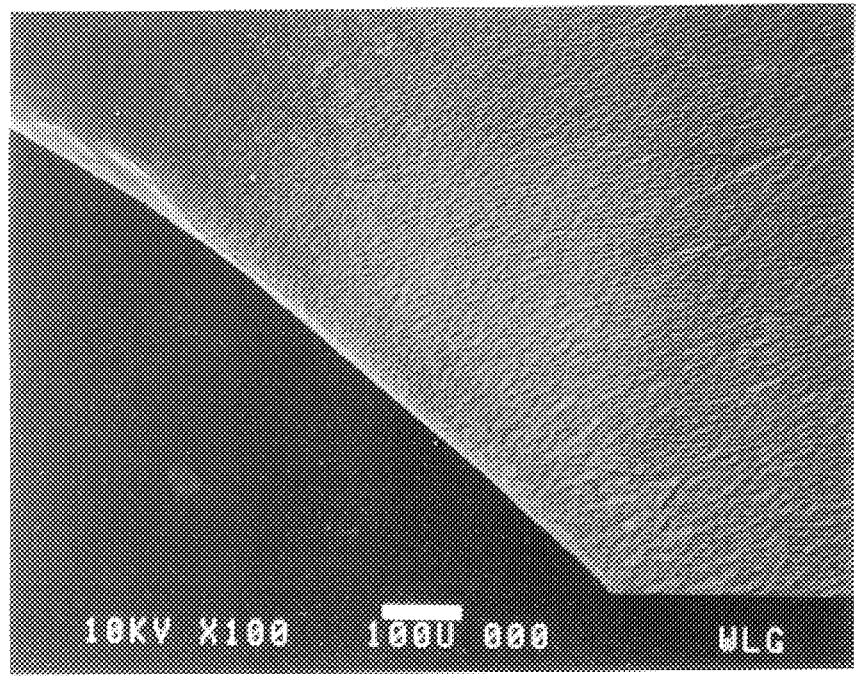
FIG. 3B is a scanning electron photomicrograph (100x) of Example 1, a macroscopically perforated porous expanded PTFE sheet material that was provided with slits as shown by FIG. 3A prior to uniaxial expansion.
Figure 3C:
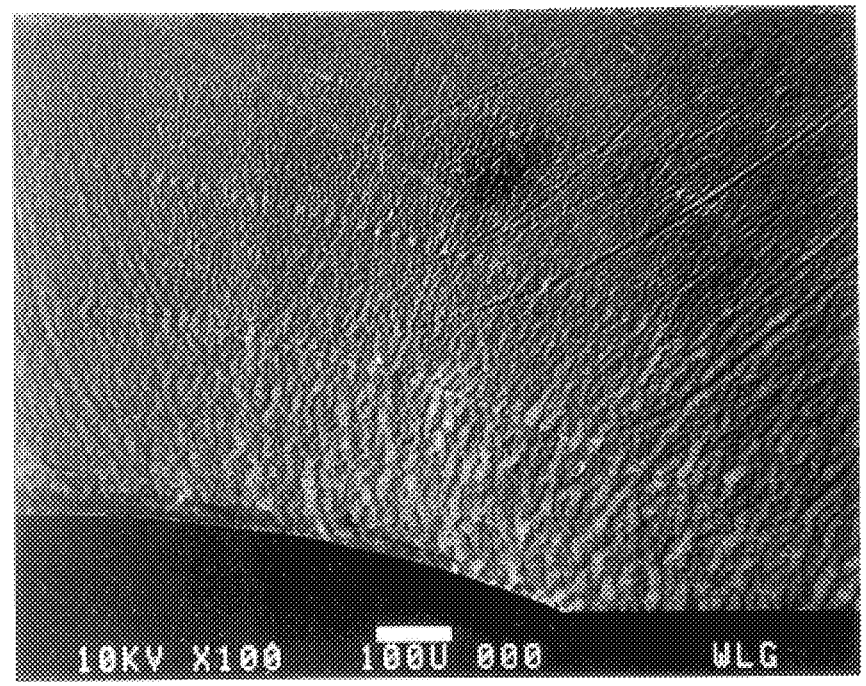
FIG. 3C is a scanning electron photomicrograph (100x) of Example 2, a macroscopically perforated porous expanded PTFE sheet material that was provided with slits as shown by FIG. 3A prior to biaxial expansion.
Figure 3E:
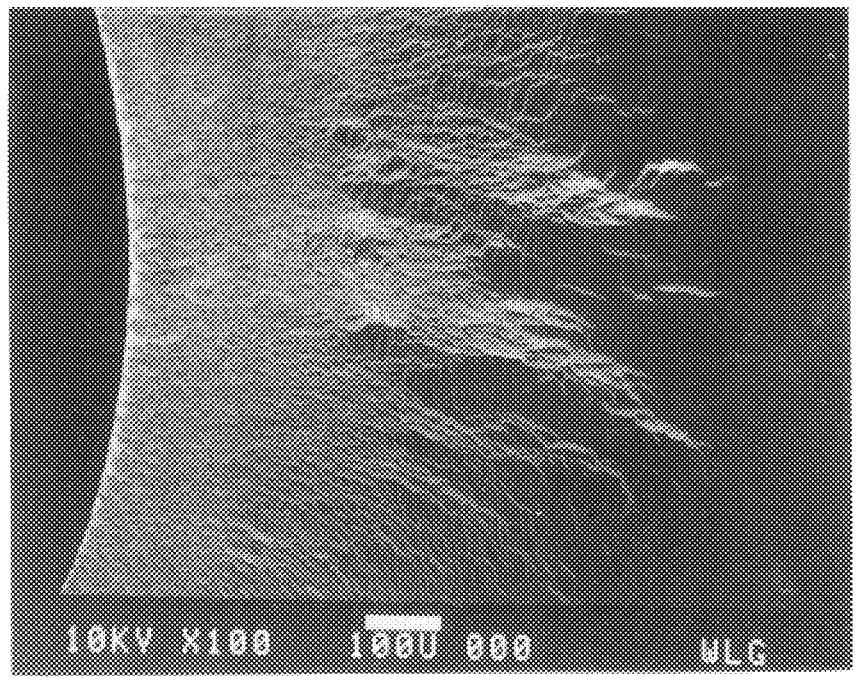
FIG. 3E is a scanning electron photomicrograph (100x) of Example 3, a macroscopically perforated porous expanded PTFE sheet material that was provided with slits as shown by FIG. 3D prior to uniaxial expansion.
Figure 3F:
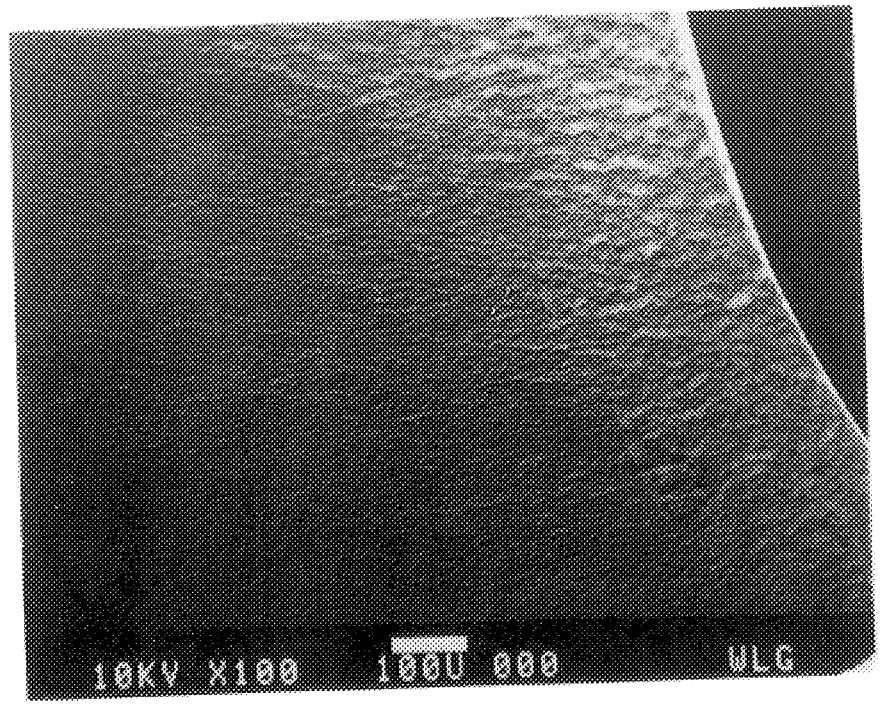
FIG. 3F is a scanning electron photomicrograph (100x) of Example 4, a macroscopically perforated porous expanded PTFE sheet material that was provided with slits as shown by FIG. 3D prior to biaxial expansion.
Figure 4B:
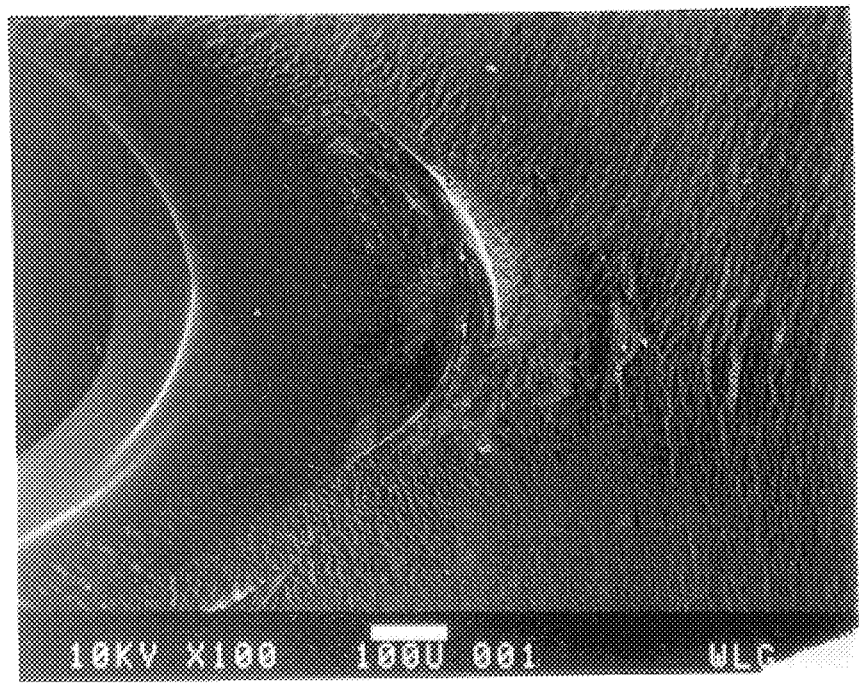
FIG. 4B is a scanning electron photomicrograph (100x) of Example 5, a macroscopically perforated porous expanded PTFE sheet material that was provided with pierced perforations as shown by FIG. 4A prior to uniaxial expansion.
Figure 4C:
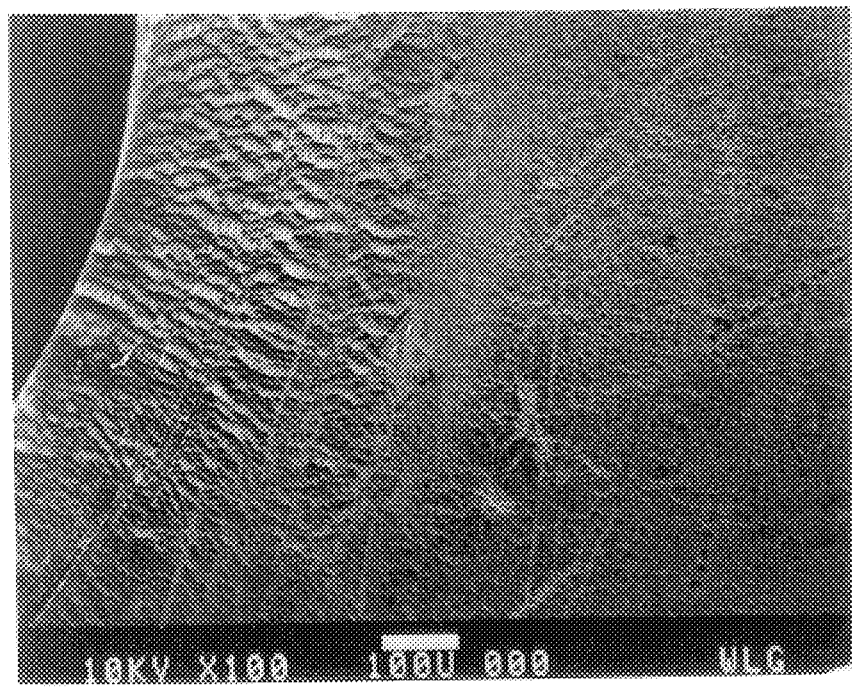
FIG. 4C is a scanning electron photomicrograph (100x) of Example 6, a macroscopically perforated porous expanded PTFE sheet material that was provided with pierced perforations as shown by FIG. 4A prior to biaxial expansion.
Figure 5B:
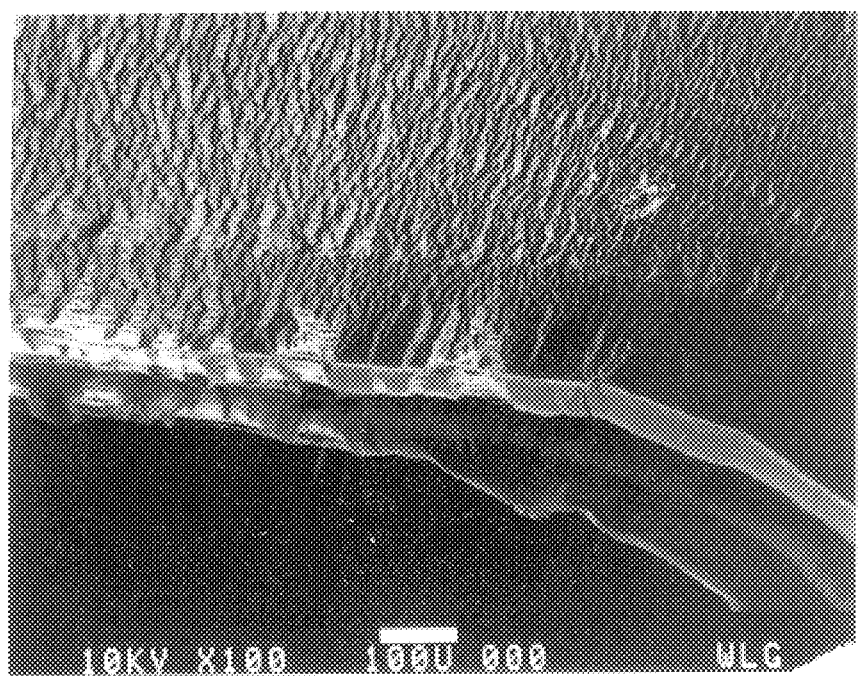
FIG. 5B is a scanning electron photomicrograph (100x) of Example 7, a macroscopically perforated porous expanded PTFE sheet material that was provided with cut perforations as shown by FIG. 5A prior to uniaxial expansion.
Figure 5C:
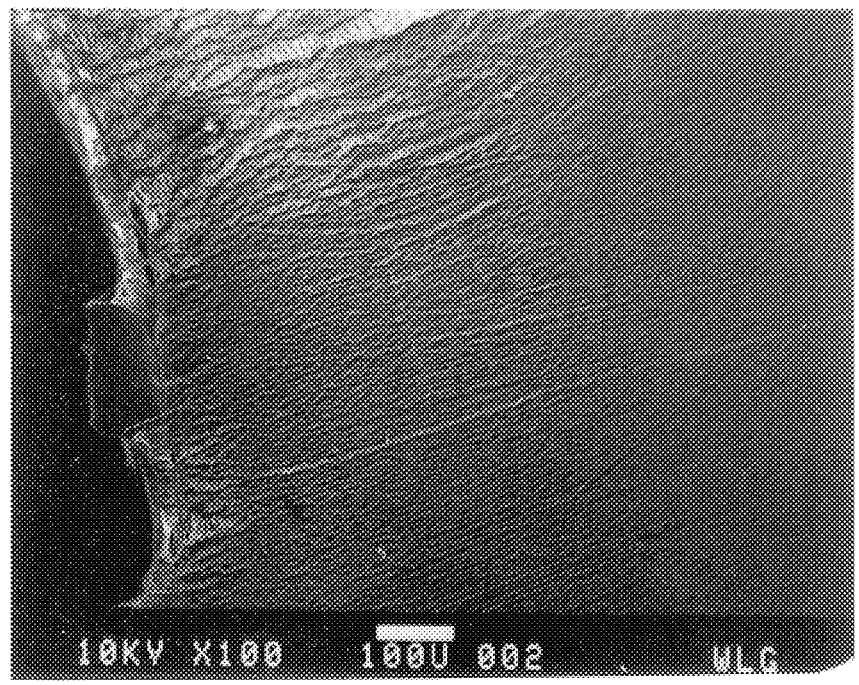
FIG. 5C is a scanning electron photomicrograph (100x) of Example 8, a macroscopically perforated porous expanded PTFE sheet material that was provided with cut perforations as shown by FIG. 5A prior to biaxial expansion.
Figure 6:
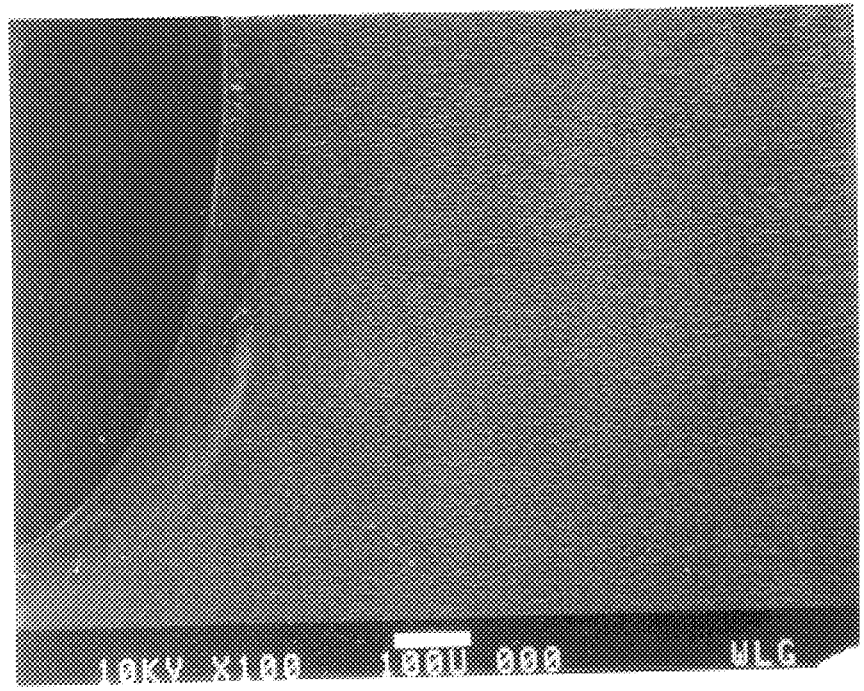
FIG. 6 is a scanning electron photomicrograph (100x) of Example 9, a macroscopically perforated porous expanded PTFE sheet material that was made by laminating four layers of the lubricated extrudate by calendering, removing the lubricant, and providing the calendered sample with pierced perforations as shown by FIG. 4A prior to uniaxial expansion.
Figure 7:
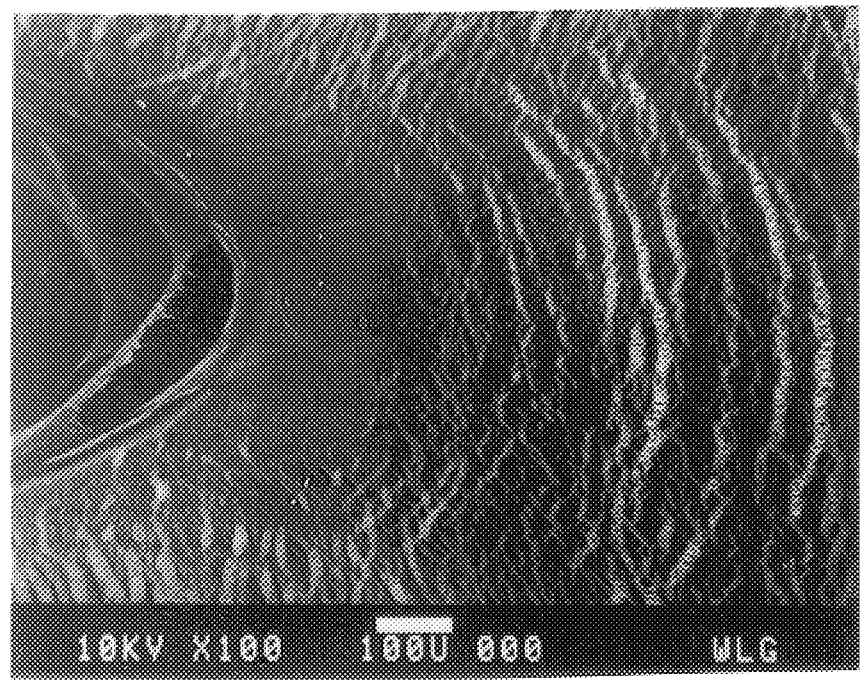
FIG. 7 is a scanning electron photomicrograph (100x) of Example 10, a macroscopically perforated porous expanded PTFE sheet material that was made by laminating four layers of the lubricated extrudate by calendering, removing the lubricant, hot compressing the layers at about 320° C. between two heated plates, and providing the compressed sample with pierced perforations as shown by FIG. 4A prior to uniaxial expansion.

Slitting describes the creation of perforations by penetration through the thickness of the extrudate with a narrow tool of elongate cross section such as a scalpel blade. Two slit patterns were used as described by FIGS. 3A and 3B. All slits were of about 5 mm length. The slits described by FIG. 3A were spaced about 5 mm apart end-to-end with the rows of slits spaced about 5 mm apart; the slits were oriented in a direction parallel to the direction of extrusion. The slits described by FIG. 3B were oriented parallel and perpendicular to the direction of extrusion and were spaced about 5 mm apart as measured from the end of one slit to the edge of the adjacent perpendicular slit.

Figure 5A:
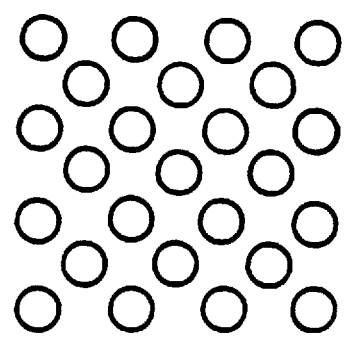
FIG. 5A describes a pattern of perforations made by removing material to form a pattern of round perforations through a sheet of PTFE extrudate prior to expansion to subsequently create a sheet of macroscopically perforated porous expanded PTFE.

Cutting is used herein to describe removal of discrete pieces of material from the extrudate by cutting with a sharp blade or punch through the thickness of the extrudate. FIG. 5A describes a pattern of round perforations made by cutting out round pieces of material of about 3.2 mm diameter with a hole punch. The resulting perforations were spaced about 7 mm apart measured as the minimum distance between the centers of adjacent perforations.

Figure 8A:
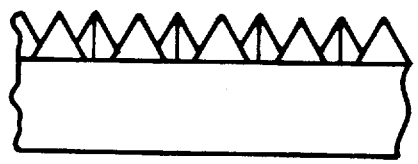
FIGS. 8A and 8B describe a metal die used to create a pattern of perforations made by impressing the repeated tetrahedral pattern onto a sheet of PTFE extrudate that had been laminated by calendering and hot compressed with the metal die against a flat metal plate prior to expansion to subsequently create a sheet of macroscopically perforated porous expanded PTFE.
Figure 8B:
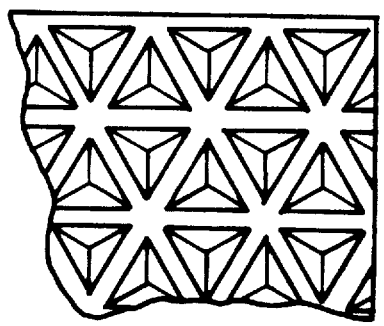
Figure 8C:
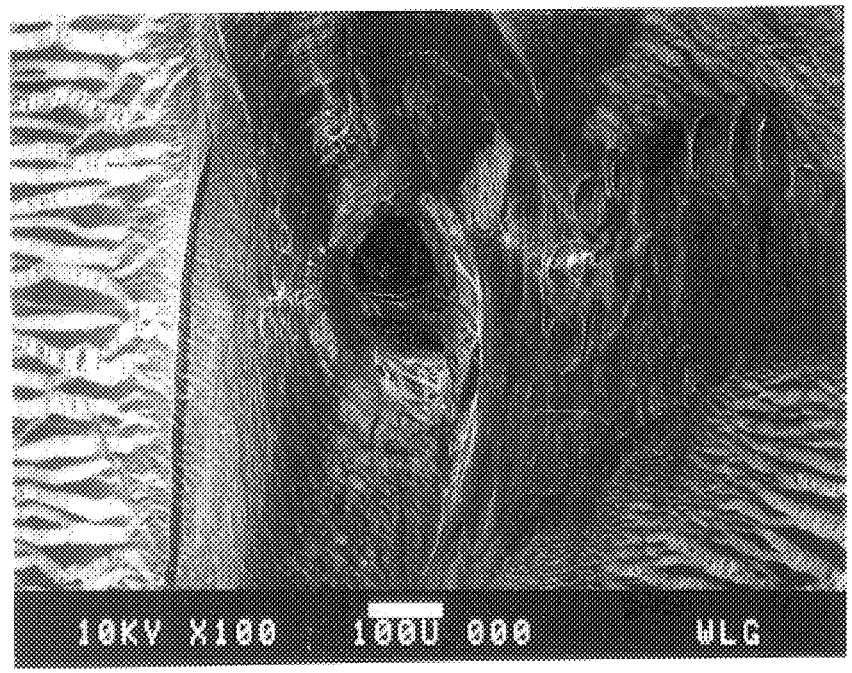
FIG. 8C is a scanning electron photomicrograph (100x) of Example 11, a macroscopically perforated porous expanded PTFE sheet material that was provided with a pattern of small triangular perforations resulting from impression of the die described by FIGS. 8A and 8B prior to uniaxial expansion.
Figure 8D:
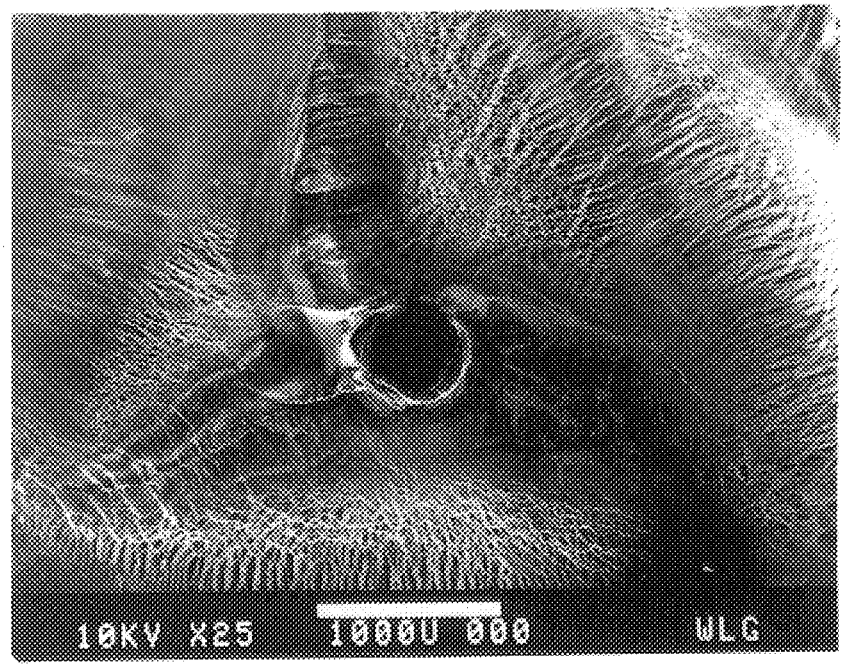
FIG. 8D is a scanning electron photomicrograph (25x) of Example 12, a macroscopically perforated porous expanded PTFE sheet material that was provided with a pattern of small triangular perforations resulting from impression of the die described by FIGS. 8A and 8B prior to biaxial expansion.

Die stamping describes the creation of perforations through the extrudate by stamping with a metal die in order to pierce the extrudate. FIGS. 8A and 8B describe cross sectional and surface views respectively of a die used to create a pattern of perforations through a sheet of extrudate. The die consisted of rows of tetrahedral shapes oriented in alternating directions as shown. The peaks of adjacent tetrahedrons were spaced about 2.1 mm apart as measured parallel to the direction of a row of tetrahedrons. Each tetrahedron was of about 1.2 mm height as measured vertically with respect to the flat planar surface of the die. The width of the flat surface lying in the flat planar surface of the die between adjacent tetrahedrons as measured perpendicular to the edges of the adjacent tetrahedrons was about 0.74 mm. The planar sides of the tetrahedrons were oriented at an angle of 30° from vertical.

CD123 fine powder PTFE resin (obtained from ICI Americas) was blended with about 285 cm$^3$ of ISOPAR K, odorless solvent (obtained from the Exxon Corporation) per kg of PTFE resin. The mixture was compressed into a cylindrical billet, heated to about 50° C. and extruded into a flat sheet of about 150 mm by 0.7 mm cross sectional dimension in a ram extruder having a reduction ratio of about 70:1. Lubricant was removed from the extrudate by drying in a forced convection air oven or alternatively by solvent extraction.

After creating perforations in samples of the extrudate by either piercing, slitting, die stamping, or removing material by cutting, the resulting perforated sheets of extrudate were cut to a square shape. The edges of the shape were placed into the grips of an expanding device such that the remaining exposed area of the extrudate sample was a square area having a length of 9.8 cm on each side. The square extrudate samples were expanded by uniaxially stretching in a single direction to a finished length of 21.9 cm for an increase in area of about 125%. Expansion was accomplished by placing the sample into an oven set at about 300° C. for a period of about 10 minutes and then expanding the sample in the direction of the previous extrusion at a rate of about 100 percent per second. This rate is calculated by dividing the total percent area increase by the total amount of time required to accomplish the expansion. The resulting expanded PTFE sheet material was of about 0.5 to 0.7 mm thickness.

Alternatively, some samples were expanded biaxially, that is, simultaneously expanded in two directions 90° apart. This was done with square pieces of extrudate retained by two pairs of opposing expander grips with the pairs oriented 90° apart, so that a 9.8 cm length of extrudate remained between each pair of opposing grips. The expansion process resulted in the length of each side of the square being increased to 21.9 cm for an area increase of about 400 percent. All biaxially expanded samples were expanded at a rate of about 320 percent per second by area after being placed into an oven set at about 300° C. for a period of about 10 minutes prior to expansion. Expansion was simultaneously accomplished at the same linear rate for both axes.

All examples were made by creating perforations in extrudate from which the lubricant had been removed. All extrudate samples were made by the process described above. Perforations were created according to the various patterns and perforation types described by Table 1; all extrudate samples were subsequently expanded either uniaxially or biaxially as described above and by Table 1. The photomicrographs describe the variable orientation of the fibrils as a function of the proximity of a fibril to the edge of a perforation. Additionally, many examples show variations in fibril length as a function of the proximity of a fibril to the edge of a perforation.

Examples 9, 10, 11 and 12 were made by laminating together four layers of the extrudate. Four 15×15 cm samples of extrudate were stacked with the extrusion directions of adjacent samples oriented 90° apart. The stack was then calendered to a thickness of about 1.0 mm. Example 9 was provided with a series of pierced perforations after removal of lubricant and then expanded uniaxially. After removal of lubricant, Example 10 was hot compressed to a thickness of about 0.75 mm between two flat heated plates at a temperature of about 320° C. and then provided with a series of pierced perforations prior to uniaxial expansion. Examples 11 and 12 were calendered as described above and then hot compressed by stamping the laminate between the die described by FIGS. 8A and 8B and a flat metal plate while the die and flat plate were heated to a temperature of about 320° C. This die stamping process simultaneously created the perforations in the extrudate. Example 11 was uniaxially expanded after die stamping; Example 12 was biaxially expanded after die stamping.

Subsequent to expansion, all samples were physically restrained to prevent shrinkage and heated by placing them into an oven set at a temperature of about 365° C. for a period of about five minutes. All photomicrographs are of inventive examples that had been subjected to this heat treatment.

It is apparent to one of ordinary skill in the art that macroscopically perforated porous expanded PTFE materials of shapes other than sheet materials may be created by making perforations in PTFE extrudate prior to expansion of the extrudate. For example, macroscopic perforations may be created in tubular PTFE extrudates prior to expansion.

TABLE 1

| Example No. | Laminated by Calend. | Hot Comp. | Perf. Pattern FIG. No. | Perf. Type | Expansion | SEM FIG. No. |
|---|---|---|---|---|---|---|
| 1 | N | N | 3A | slit | uniaxial | 3B |
| 2 | N | N | 3A | slit | biaxial | 3C |
| 3 | N | N | 3D | slit | uniaxial | 3E |
| 4 | N | N | 3D | slit | biaxial | 3F |
| 5 | N | N | 4A | pierced | uniaxial | 4B |
| 6 | N | N | 4A | pierced | biaxial | 4C |
| 7 | N | N | 5A | cut | uniaxial | 5B |
| 8 | N | N | 5A | cut | biaxial | 5C |
| 9 | Y | N | 4A | pierced | uniaxial | 6 |
| 10 | Y | Y | 4A | pierced | uniaxial | 7 |
| 11 | Y | Y | 8A & 8B | die stamped | uniaxial | 8C |

TABLE 1-continued

| Example No. | Laminated by Calend. | Hot Comp. | Perf. Pattern FIG. No. | Perf. Type | Expansion | SEM FIG. No. |
|---|---|---|---|---|---|---|
| 12 | Y | Y | 8A & 8B | die stamped | biaxial | 8D |

In the table heading, the abbreviation No. stands for number, Calend. stands for calendering, Comp. stands for compressed, Perf. stands for perforation, and SEM stands for scanning electron micrograph.

We claim:

1. A macroscopically perforated porous expanded polytetrafluoroethylene sheet material comprising a sheet of porous expanded polytetrafluoroethylene having a microstructure of nodes interconnected by fibrils and having perforations through the sheet material, wherein the perforations have a mean minimum diameter of at least about 0.1 mm and wherein the orientation of a fibril varies as a function of the proximity of the fibril to the edge of a perforation.

2. A macroscopically perforated porous expanded polytetrafluoroethylene sheet material according to claim 1 wherein length of a fibril varies as a function of the proximity of the fibril to the edge of a perforation.

3. A macroscopically perforated porous expanded polytetrafluoroethylene sheet material according to claim 1 wherein the perforations have a mean minimum diameter of about 0.2 mm.

4. A macroscopically perforated porous expanded polytetrafluoroethylene sheet material according to claim 3 wherein length of a fibril varies as a function of the proximity of the fibril to the edge of a perforation.

5. A macroscopically perforated porous expanded polytetrafluoroethylene sheet material according to claim 1 wherein the perforations have a mean minimum diameter of about 0.5 mm.

6. A macroscopically perforated porous expanded polytetrafluoroethylene sheet material according to claim 5 wherein length of a fibril varies as a function of the proximity of the fibril to the edge of a perforation.

7. A macroscopically perforated porous expanded polytetrafluoroethylene sheet material comprising a sheet of porous expanded PTFE having a microstructure of nodes interconnected by fibrils and having perforations through the sheet material, wherein the perforations have a mean minimum diameter of at least about 0.1 mm and wherein the length of a fibril varies as a function of the proximity of the fibril to the edge of a perforation.

8. A macroscopically perforated porous expanded polytetrafluoroethylene sheet material according to claim 7 wherein the perforations have a mean minimum diameter of about 0.2 mm.

9. A macroscopically perforated porous expanded polytetrafluoroethylene sheet material according to claim 7 wherein the perforations have a mean minimum diameter of about 0.5 mm.

10. A method for making macroscopically perforated porous expanded polytetrafluoroethylene material having a microstructure of nodes connected by fibrils, comprising extruding a preformed billet of a mixture of polytetrafluoroethylene and liquid lubricant to form an extrudate, forming macroscopic perforations through the extrudate, removing the liquid lubricant from the extrudate, expanding said polytetrafluoroethylene by stretching said polytetrafluoroethylene and maintaining said polytetrafluoroethylene at a temperature between about 35° C. and the crystalline melt point during stretching, and heating said polytetrafluoroethylene.

11. A method according to claim 10 wherein multiple layers of extrudate are laminated by calendering before forming the macroscopic perforations through the calendered extrudate.

12. A method according to claim 10 wherein said polytetrafluoroethylene is uniaxially expanded.

13. A method according to claim 10 wherein said polytetrafluoroethylene is biaxially expanded.

14. A method according to claim 11 wherein said polytetrafluoroethylene is uniaxially expanded.

15. A method according to claim 11 wherein said polytetrafluoroethylene is biaxially expanded.

16. A method according to claim 10 wherein the heating of said polytetrafluoroethylene is accomplished at a temperature above about the crystalline melt point of polytetrafluoroethylene.

17. A method according to claim 10 wherein the method of forming macroscopic perforations through the extrudate is chosen from the group consisting of piercing, slitting, cutting to remove material, and die stamping.

18. A method according to claim 17 wherein the heating of said polytetrafluoroethylene is accomplished at a temperature above about the crystalline melt point of polytetrafluoroethylene.

19. A method for making macroscopically perforated porous expanded polytetrafluoroethylene material having a microstructure of nodes connected by fibrils, comprising extruding a preformed billet of a mixture of polytetrafluoroethylene and liquid lubricant to form an extrudate, removing the liquid lubricant from the extrudate, forming macroscopic perforations through the extrudate, expanding said polytetrafluoroethylene by stretching said polytetrafluoroethylene and maintaining said polytetrafluoroethylene at a temperature between about 35° C. and the crystalline melt point during stretching, and heating said polytetrafluoroethylene.

20. A method according to claim 19 wherein multiple layers of extrudate are laminated by calendering before removing the liquid lubricant from the extrudate.

21. A method according to claim 20 wherein the calendered extrudate is compressed under heat and pressure after removing the liquid lubricant and before forming the macroscopic perforations through the calendered extrudate.

22. A method according to claim 20 wherein the liquid lubricant is removed from the calendered extrudate and the calendered extrudate is subsequently compressed under heat and pressure to form the macroscopic perforations through the calendered extrudate.

23. A method according to claim 19 wherein said polytetrafluoroethylene is uniaxially expanded.

24. A method according to claim 19 wherein said polytetrafluoroethylene is biaxially expanded.

25. A method according to claim 20 wherein said polytetrafluoroethylene is uniaxially expanded.

26. A method according to claim 20 wherein said polytetrafluoroethylene is biaxially expanded.

27. A method according to claim 21 wherein said polytetrafluoroethylene is uniaxially expanded.

28. A method according to claim 21 wherein said polytetrafluoroethylene is biaxially expanded.

29. A method according to claim 22 wherein said polytetrafluoroethylene is uniaxially expanded.

30. A method according to claim 22 wherein said polytetrafluoroethylene is biaxially expanded.

31. A method according to claim 19 wherein the heating of said polytetrafluoroethylene is accomplished at a temperature above about the crystalline melt point of polytetrafluoroethylene.

32. A method according to claim 19 wherein the method of forming macroscopic perforations through the extrudate is chosen from the group consisting of piercing, slitting, cutting to remove material, and die stamping.

33. A method according to claim 32 wherein the heating of said polytetrafluoroethylene is accomplished at a temperature above about the crystalline melt point of polytetrafluoroethylene.

34. A macroscopically perforated porous expanded polytetrafluoroethylene article made by the method of claim 10.

35. A macroscopically perforated porous expanded polytetrafluoroethylene article made by the method of claim 11.

36. A macroscopically perforated porous expanded polytetrafluoroethylene article made by the method of claim 12.

37. A macroscopically perforated porous expanded polytetrafluoroethylene article made by the method of claim 13.

38. A macroscopically perforated porous expanded polytetrafluoroethylene article made by the method of claim 14.

39. A macroscopically perforated porous expanded polytetrafluoroethylene article made by the method of claim 15.

40. A macroscopically perforated porous expanded polytetrafluoroethylene article made by the method of claim 16.

41. A macroscopically perforated porous expanded polytetrafluoroethylene article made by the method of claim 17.

42. A macroscopically perforated porous expanded polytetrafluoroethylene article made by the method of claim 18.

43. A macroscopically perforated porous expanded polytetrafluoroethylene article made by the method of claim 19.

44. A macroscopically perforated porous expanded polytetrafluoroethylene article made by the method of claim 20.

45. A macroscopically perforated porous expanded polytetrafluoroethylene article made by the method of claim 21.

46. A macroscopically perforated porous expanded polytetrafluoroethylene article made by the method of claim 22.

47. A macroscopically perforated porous expanded polytetrafluoroethylene article made by the method of claim 23.

48. A macroscopically perforated porous expanded polytetrafluoroethylene article made by the method of claim 24.

49. A macroscopically perforated porous expanded polytetrafluoroethylene article made by the method of claim 25.

50. A macroscopically perforated porous expanded polytetrafluoroethylene article made by the method of claim 26.

51. A macroscopically perforated porous expanded polytetrafluoroethylene article made by the method of claim 27.

52. A macroscopically perforated porous expanded polytetrafluoroethylene article made by the method of claim 28.

53. A macroscopically perforated porous expanded polytetrafluoroethylene article made by the method of claim 29.

54. A macroscopically perforated porous expanded polytetrafluoroethylene article made by the method of claim 30.

55. A macroscopically perforated porous expanded polytetrafluoroethylene article made by the method of claim 31.

56. A macroscopically perforated porous expanded polytetrafluoroethylene article made by the method of claim 32.

57. A macroscopically perforated porous expanded polytetrafluoroethylene article made by the method of claim 33.

* * * * *